United States Patent
Asaki et al.

[19]

[11] Patent Number: 5,915,651

[45] Date of Patent: Jun. 29, 1999

[54] REVERSE THRUST INLET VORTEX INHIBITOR

[75] Inventors: Sam Isamu Asaki, Huntington Beach, Calif.; Kenneth Jack Cooper, Emmett, Id.; Gordon L. Hamilton, Manhattan Beach, Calif.; Christopher J. Johns, Lakewood, Calif.; James R. Jones; James G. McComb, both of Huntington Beach, Calif.

[73] Assignee: McDonnell Douglas Corporation, Huntington Beach, Calif.

[21] Appl. No.: 08/891,218

[22] Filed: Jul. 10, 1997

[51] Int. Cl.$^6$ ..................................... F02K 1/62
[52] U.S. Cl. ................. 244/110 B; 239/265.29; 60/39.092; 60/230
[58] Field of Search ............... 244/110 B; 60/39.092, 60/230–231, 226.2; 239/265.29, 265.19–31

[56] References Cited

U.S. PATENT DOCUMENTS

| | | |
|---|---|---|
| 2,915,262 | 12/1959 | Klein . |
| 3,298,637 | 1/1967 | Lee . |
| 3,387,456 | 6/1968 | Feder et al. . |
| 3,527,430 | 9/1970 | Smith . |
| 3,599,429 | 8/1971 | Bigelis et al. . |
| 3,667,680 | 6/1972 | Weed ................... 244/110 B |
| 3,905,566 | 9/1975 | Anderson . |
| 3,941,313 | 3/1976 | Jumelle ................ 244/110 B |
| 4,070,827 | 1/1978 | Vanfleet et al. . |
| 4,381,017 | 4/1983 | Bissinger . |
| 5,396,762 | 3/1995 | Standish .............. 244/110 B |
| 5,671,598 | 9/1997 | Standish .............. 244/110 B |

*Primary Examiner*—Galen L. Barefoot
*Attorney, Agent, or Firm*—Harness Dickey & Pierce P.L.C.

[57] ABSTRACT

A method and apparatus are provided for inhibiting the formation of inlet vortices in a turbofan engine/nacelle installation 10 for use with an aircraft. The present invention redirects fan air from a fan air bypass duct 16, in a generally downward direction from the outer nacelle 18 in order to generate an air curtain 48 for inhibiting inlet vortex formation.

14 Claims, 4 Drawing Sheets

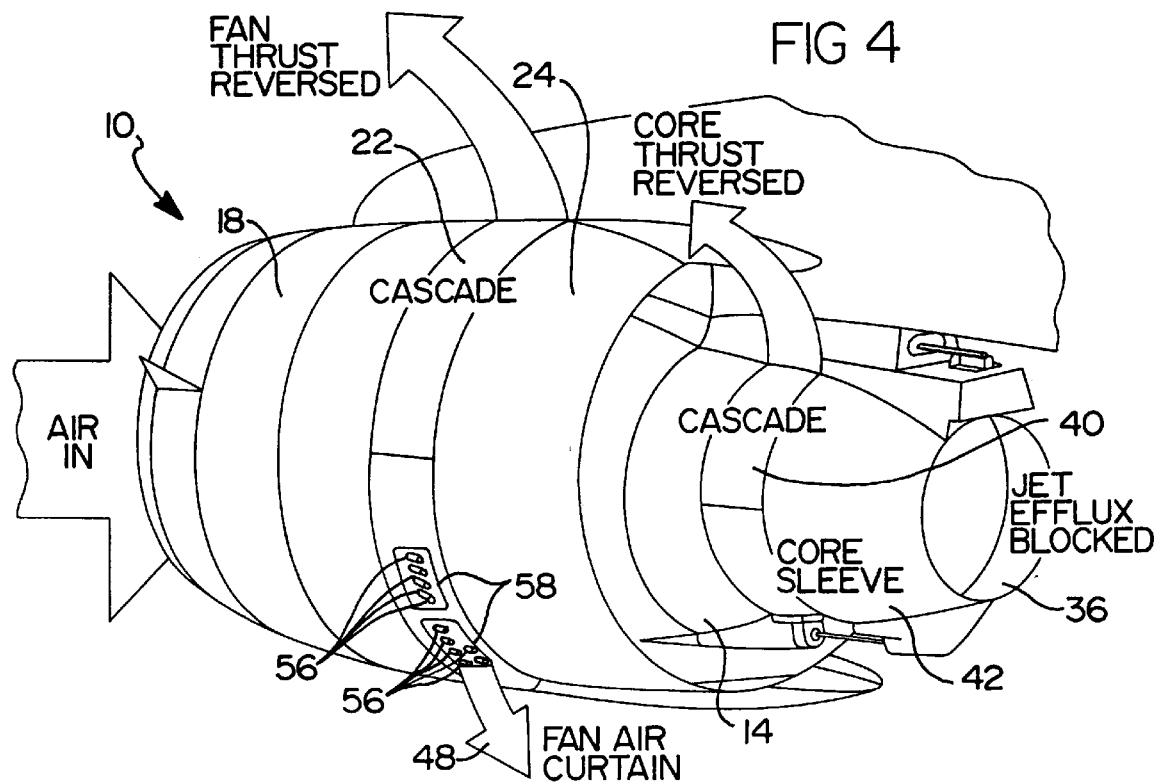
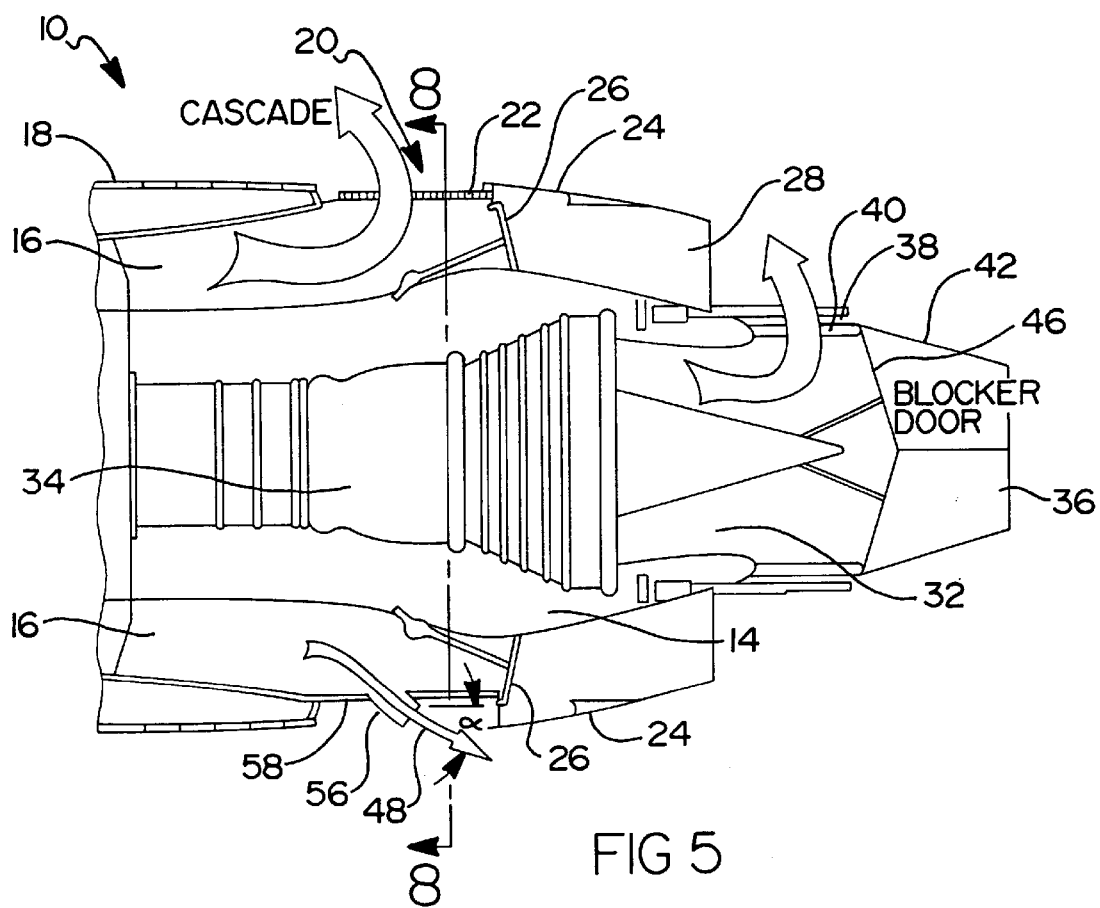

FIG 6
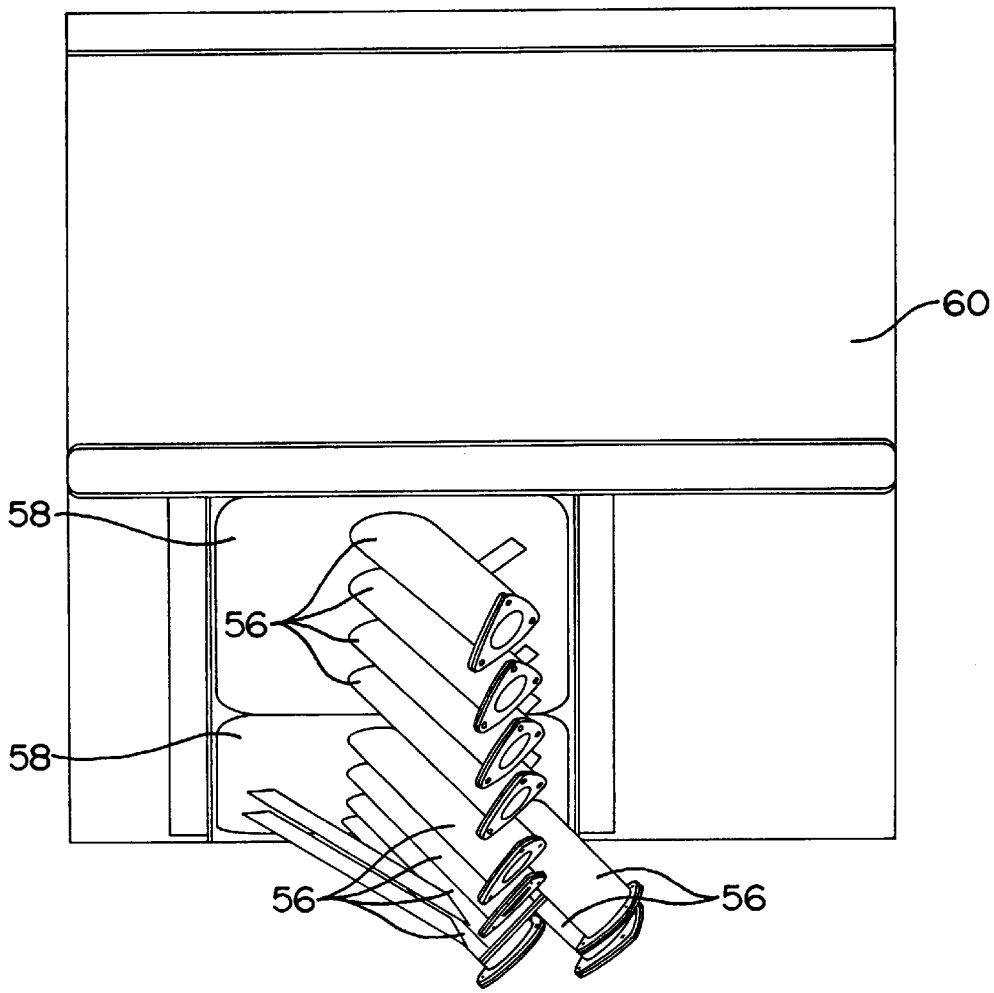
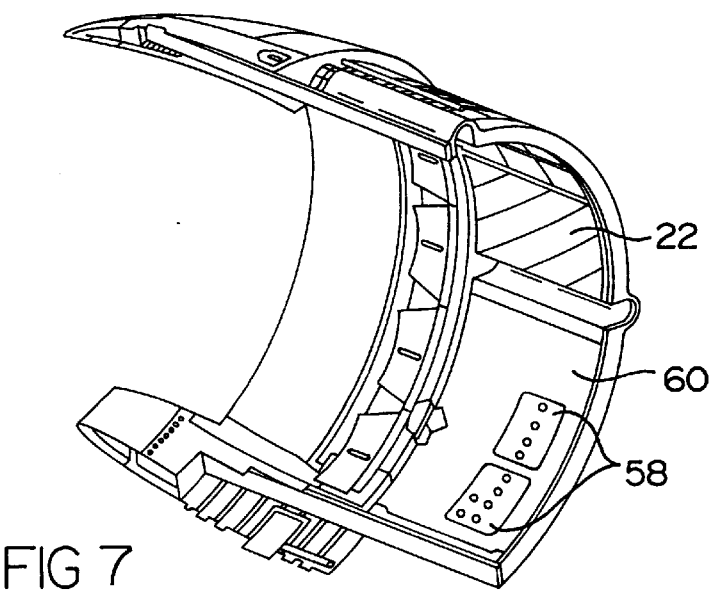
FIG 7

REVERSE THRUST INLET VORTEX INHIBITOR

The U.S. Government has a paid-up license in this invention and the right in limited circumstances to require the patent owner to license others on reasonable terms as provided by the terms of contract F33657-95-C-2027 awarded by the U.S. Air Force.

BACKGROUND OF THE INVENTION

1. Technical Field

The present invention relates to internal combustion engines, particularly gas turbine engines associated with aircraft propulsion. More specifically, the invention relates to a method and apparatus for limiting ingestion of ground debris into the inlet of aircraft engines.

2. Background Art

Gas turbine engines for use with aircraft generally require large quantities of air flowing at high velocities to produce motive thrust or power generation. Turbojet and turbofan engines operated statically or for ground maneuvering tend to develop inlet vortices. Inlet vortices, which extend between the ground and a jet engine inlet, form around a stagnation streamline in the inlet flow provided there is sufficient ambient vorticity to continuously feed the vortex. A stagnation streamline forms whenever substantial amounts of air are being ingested by the inlet from behind and underneath the engine. The high rotational velocities of engine inlet vortices kick-up dust, dirt, and debris which may become undesirably entrained with the general inlet flow and ingested into the engine. Occasionally, objects are lifted by the low pressure region near the core of the vortices at the ground.

Devices have been designed to prevent or inhibit the formation of vortices between turbojet or turbofan inlets and the ground primarily during static operation or ground maneuvering when using forward thrust. Devices which have been used in service rely on engine compressor bleed air which is plumbed to the inlet lip to provide cowl ice protection and/or inlet vortex suppression. The earliest devices such as that shown in U.S. Pat. No. 2,915,262 issued to Klein, directed a jet of air onto the ground in front of the engine so that an inlet vortex could not reach the ground. Other devices such as shown in U.S. Pat. No. 4,070,827 issued to VanFleet et al, and U.S. Pat. No. 3,599,429 issued to Bigelis et al, direct jets of air below the inlet lip aft underneath the engine nacelle to prevent the formation of a stagnation stream line between the engine inlet and the ground by drawing/entraining air aft underneath the engine nacelle thereby blocking airflow underneath the engine from moving forward into the inlet. These devices are used on commercially operated, low wing transport aircraft having wing mounted engines hung close to the ground which are generally operated over relatively clean surfaces.

There is a class of high wing transport aircraft which has been developed to be capable of ground maneuvering on airfields having unimproved surfaces using high levels of reverse thrust to back up or to turn. In these types of aircraft, reverse thrust inlet vortex activity is generally observed to be worse than forward thrust vortex activity. Due to the large volumes of airflow entering each engine inlet during thrust reverser operation, and due to the increased height of the engines above the ground, conventional methods of discouraging inlet vortex formation using jets of air underneath the engine inlet would require relatively large amounts of highly compressed core engine gas path air. So much compressor bleed air would be required that the amount of compressor bleed air may also exceed the engine capability. Furthermore, large heavy ducting and special control systems would be required.

DISCLOSURE OF THE INVENTION

Accordingly, the reverse thrust inlet vortex inhibitor concept according to the present invention takes advantage of the large quantities of air passing through the fan air bypass duct and provides a relatively large, high flow, curtain of fan duct air directed downwards underneath the engine nacelle. These jets provide the entrainment and blockage necessary to deter formation of a stagnation streamline between the engine inlet and the ground. In addition, no long, heavy ducting is required and no provisions for controlling or valving the reverse thrust inlet vortex inhibitor flow are required. The jets become active when the thrust reverser is deployed and are deactivated when the thrust reverser stows and seals for forward thrust operation. Although this device is particularly suited for use on high wing aircraft, it is also applicable to low wing aircraft.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 4 is a perspective view of the turbofan engine/nacelle installation according to the principles of the present invention, showing the reverse thrust mode with the reverse thrust inlet vortex inhibitor generating an air curtain for inhibiting vortex formation;

FIG. 5 is a cross-sectional view of the turbofan engine/nacelle installation according to the present invention in the reverse thrust mode illustrating the airflow pattern through the reverse thrust cascades and through one nozzle of the reverse thrust inlet vortex inhibitor according to the principles of the present invention;

FIG. 6 is a side view of the reverse thrust inlet vortex inhibitor panel and the nozzles disposed therein;

FIG. 7 is a perspective view of the internal surface of the reverse thrust inlet vortex inhibitor panel disposed beneath the cascade panel according to the principles of the present invention.

DETAILED DESCRIPTION OF THE INVENTION

Figure 1:
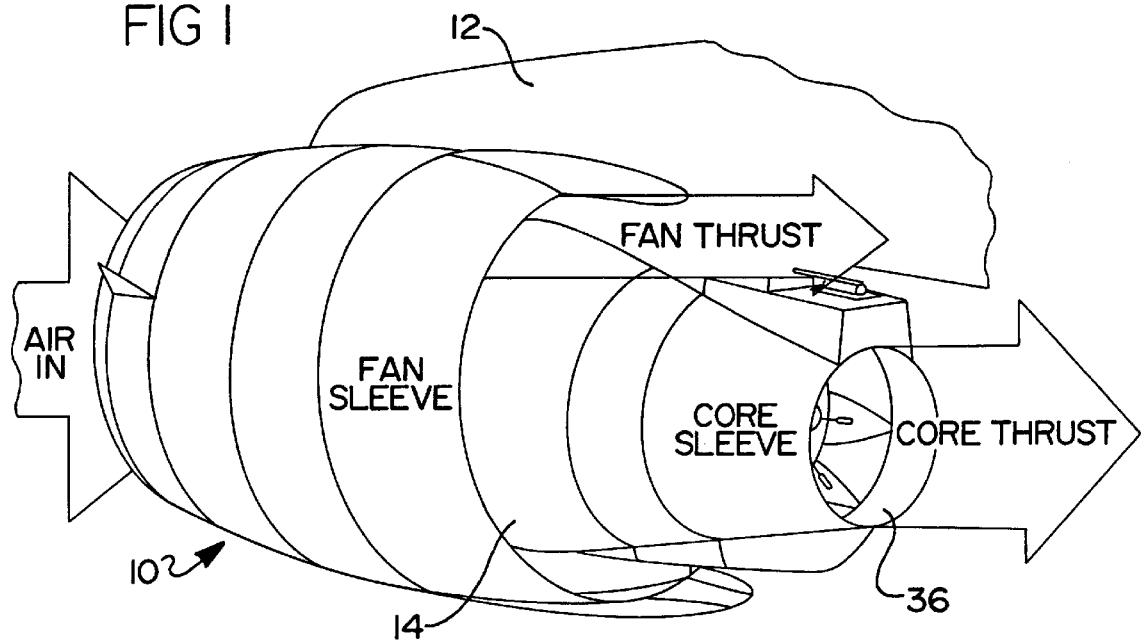
FIG. 1 is a perspective view of a turbofan engine/nacelle installation for use with an aircraft, shown in the forward thrust mode.
Figure 2:
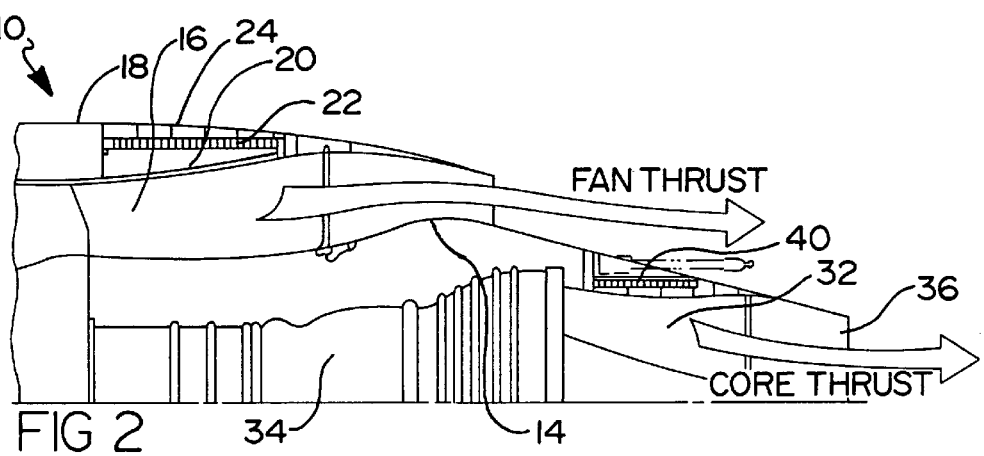
FIG. 2 is a partial cross-sectional view of the turbofan engine/nacelle installation illustrating the airflow in a forward thrust mode.

With reference to FIGS. 1–8, the reverse thrust inlet vortex inhibitor according to the present invention will be described. FIG. 1 shows a turbofan engine/nacelle installation 10 supported by an aircraft pylon 12. The jet engine 34 is of the type having a fan, compressor, a combustion chamber, and turbines (not shown) coaxially aligned and disposed within a core cowl 14, and an outer nacelle 18.

A fan air bypass duct 16 is disposed between the core cowl 14 and an outer nacelle 18. The outer nacelle includes a reverse thrust passageway 20 formed therethrough with a cascade mechanism 22 disposed in the reverse thrust passageway 20. A fan sleeve 24 is disposed as the aft part of the outer nacelle 18 and is capable of translating in a fore and aft direction for providing a door mechanism for opening and closing the reverse thrust passageway 20. The fan sleeve 24 also includes an internal blocker door 26, best shown in FIG. 5, for at least partially inhibiting flow of fan air through the exit end 28 of the fan air bypass duct 16. Accordingly, the blocker door 26 causes the fan air in the fan air bypass duct 16 to be redirected through the cascade mechanism 22 while the fan sleeve 24 is translated to an aft position. The redirection of fan air through the cascade mechanism 22 generates a reverse thrust.

The turbofan engine/nacelle installation 10 is also provided with a turbine exhaust passage 32 which directs the exhaust air from the engine 34 turbine to the turbine exhaust outlet 36. The core cowl 14 is provided with a turbine reverse thrust passageway 38 having a cascade mechanism 40 disposed therein. A turbine sleeve 42 is provided for translating in a fore and aft direction for opening and closing the turbine reverse thrust passageway 38. In addition, a blocker door 46 is provided for at least partially closing the exhaust outlet 36 and redirecting the exhaust air through a cascade mechanism 40 for generating a reverse thrust, as best shown in FIGS. 4 and 5. It should be understood that the present invention is applicable to an engine with or without a turbine reverser.

Figure 3:
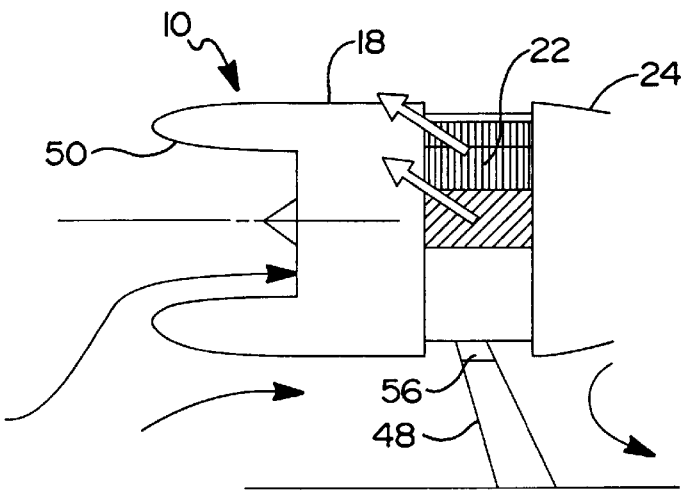
FIG. 3 is a schematic illustration of the turbofan engine/nacelle installation according to the present invention showing the air curtain generated by the reverse thrust inlet vortex inhibitor design of the present invention.
Figure 8:
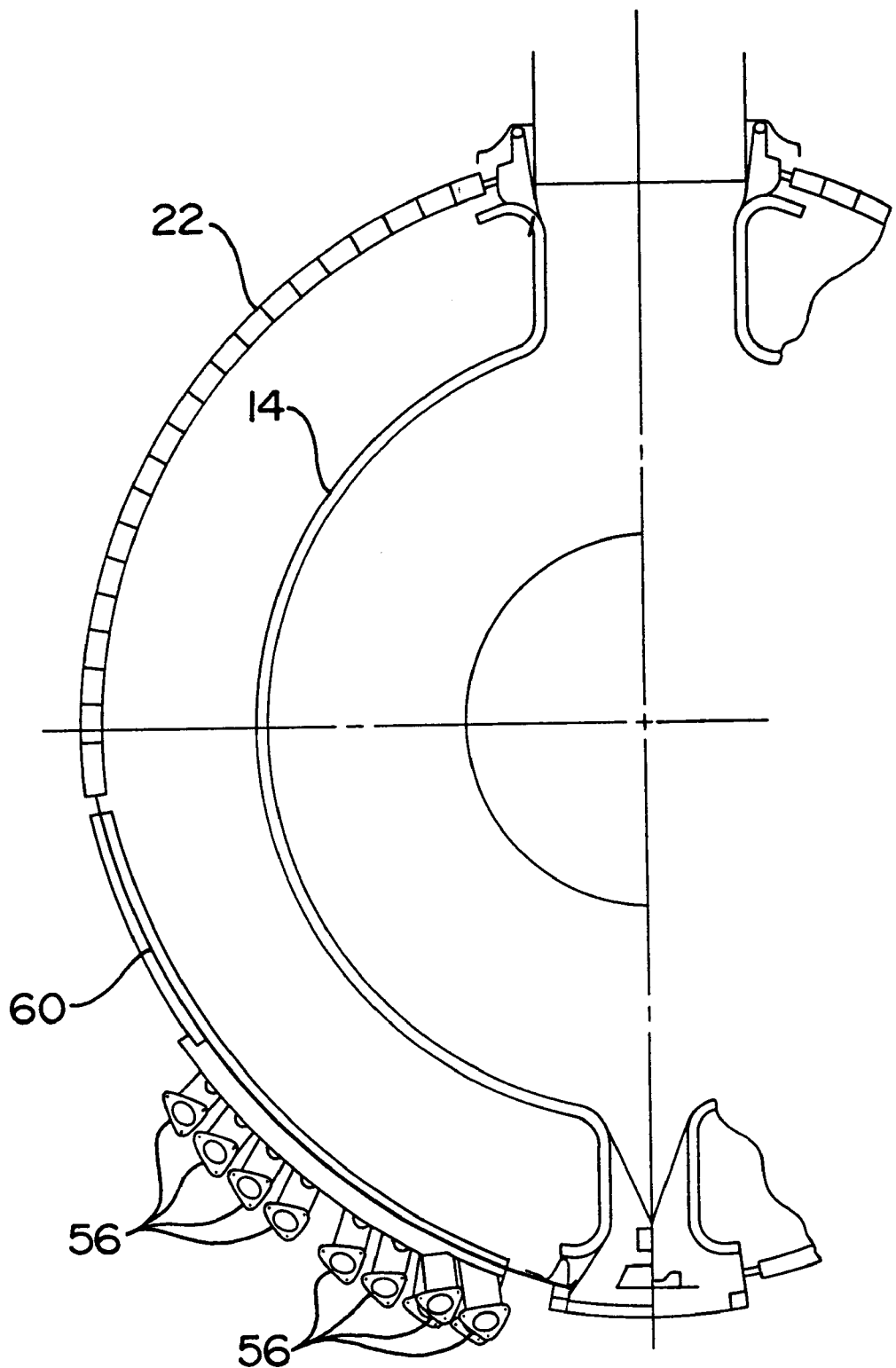
FIG. 8 is a partial cross-sectional view taken along line 8—8 of FIG. 5.

With reference to FIG. 3, the reverse thrust inlet vortex inhibitor design according to the present invention directs jets 48 of fan duct exhaust underneath the fan thrust reverser cascades 22 to entrain air aft and to block movement of air forward to the inlet 50 from behind and underneath the turbofan engine/nacelle installation 10, as shown. A fan air curtain 48, according to one embodiment, is generated by a plurality of tubes/nozzles 56 which are connected to the panels 58 disposed in the blocker panel 60 below the fan thrust reverser cascades 22.

With reference to FIG. 5, the angle α which represents the angle off the radial from the engine centerline is preferably between 15 and 90 degrees. The nozzles 56 are aligned with one another so as to direct air jets generally downward from the turbofan engine/nacelle installation 10 to thereby generate an air curtain which inhibits formation of inlet vortices.

According to the present invention, the nozzles 56 are only operable during reverse thrust operation. As shown in FIG. 5, aft translation of the fan sleeve 24 along with movement of the blocker doors 26 for blocking exit end 28 of fan air bypass duct 16 redirects the fan air not only through the cascades 22 for creating a reverse thrust, but is also directed through the tubes 56 for generating the fan air curtain 48 thereby inhibiting formation of inlet vortices. The present invention employs engine fan air exhaust flow which is also being directly employed to produce reverse thrust and therefore, no engine compressor bleed air is required. The system of the present invention also does not require any specific or dedicated control inputs or signals to activate, but simply functions whenever the thrust reverser functions.

The invention being thus described, it will be obvious that the same may be varied in many ways. For example, the fan air curtain 48, can be formed by any mechanism employed to direct the airflow such as tubes, slots, louvers, screens, or cascades. Furthermore, it should be understood that the present invention can be utilized in combination with known bleed-air type vortex inhibitors in order to supplement the vortex inhibiting capabilities thereof. Such variations are not to be regarded as a departure from the spirit and scope of the invention, and all such modifications as would be obvious to one skilled in the art are intended to be included within the scope of the following claims.

What is claimed is:

1. An inlet vortex inhibitor for use with a turbofan engine/nacelle installation having a fore end and an aft end, and being of the type having a fan compressor, a combustion chamber and at least one turbine coaxially aligned and disposed within a core cowl, a fan air bypass duct disposed between said core cowl and an outer nacelle, the outer nacelle having a reverse thrust passageway formed therethrough with a cascade mechanism disposed in said reverse thrust passageway and a door mechanism for opening and closing said reverse thrust passageway for directing fan air through said reverse thrust passageway during a reverse thrust operation, thereby providing a reverse thrust force, said inlet vortex inhibitor comprising:

a vortex inhibitor passageway disposed in a lower circumferential panel portion of said engine/nacelle installation internally of said outer nacelle for directing fan air from said fan air bypass duct during said reverse thrust operation generally downwardly from said outer nacelle, thereby generating an air curtain for inhibiting inlet vortex formation;

said vortex inhibitor Passageway including a plurality of passages formed in said lower circumferential panel portion, wherein said lower cirumferential panel portion resides within a bottom circumferential half of said outer nacelle and is fixed so as to be non-movable relative to said outer nacelle, and wherein said passages are formed to direct a portion of said fan air discharged therethrough during said reverse thrust operation outwardly of said outer nacelle and at least slightly toward said aft end of said engine/nacelle installation to thereby form said air curtain.

2. The inlet vortex inhibitor according to claim 1, wherein said door mechanism also opens and closes said vortex inhibitor passageway.

3. The inlet vortex inhibitor according to claim 1, wherein said passages direct said fan airflow at a predetermined angle between about 15 and 90 degrees radially off from an engine centerline.

4. The inlet vortex inhibitor according to claim 2, wherein said door mechanism includes a fan sleeve capable of translating in fore and aft directions.

5. The inlet vortex inhibitor according to claim 2, wherein said door mechanism includes a blocker door disposed on an interior side of said cascade mechanism and being movable from a closed position adjacent to said cascade mechanism to an open position for at least partially blocking air flow through said fan air bypass duct.

6. A turbofan engine/nacelle installation for use with an aircraft, comprising:

an outer nacelle defining an inlet end and an outlet end;

a fan disposed in said inlet end of said outer nacelle;

an engine including a fan, a compressor, a combustion chamber, and at least one turbine coaxially disposed within a core cowl;

a fan air bypass duct disposed between said core cowl and said outer nacelle for directing fan air so as to generate a reverse thrust when said engine is placed in a reverse thrust mode;

a vortex inhibitor passageway disposed in a circumferential panel forming a portion of said fan air bypass duct in a lower half area of said duct for directing fan air from said fan air bypass duct generally from said turbofan engine/nacelle installation thereby generating an air curtain for inhibiting inlet vortex formation during said reverse thrust mode;

a door mechanism movable between a first position for closing said vortex inhibitor passageway permitting flow of said fan air through to an outlet end of said fan air bypass duct, and a second position for at least partially blocking air flow through to said outlet end of said fan air bypass duct and permitting said fan air flow through said vortex inhibitor passageway; and wherein said vortex inhibitor passageway is independent of said door mechanism and disposed fixedly within said outer nacelle.

7. The turbofan engine/nacelle installation according to claim 6, wherein said door mechanism includes a fan sleeve capable of translating in a fore and aft direction.

8. The turbofan engine/nacelle installation according to claim 7, wherein said door mechanism further includes a blocker door disposed on an interior side of said vortex inhibitor passageway.

9. The turbofan engine/nacelle installation according to claim 6, wherein said vortex inhibitor passageway includes a plurality of tubes extending at a predetermined angle radially outwardly from a longitudinal center of said engine.

10. The turbo fan engine/nacelle installation according to claim 9, wherein said predetermined angle is between 15 and 90 degrees.

11. A method of inhibiting formation of inlet vortices of a turbofan engine/nacelle installation of the type having a fore end and an aft end, and further having a fan air bypass duct disposed between a core cowl and an outer nacelle, said method comprising the steps of:

providing a vortex inhibitor passage formed in a fixed, circumferential panel disposed interiorly of said outer nacelle adjacent a lower half area of said outer nacelle;

providing a door moveable from a closed position during a forward thrust mode and an open position during a reverse thrust mode, to thereby permit a substantial portion of fan airflow flowing through said fan air bypass duct to be directed in a reverse thrust direction outwardly of said outer nacelle during a reverse thrust mode of operation; and directing said fan air flowing through said fan air bypass duct in a generally downward direction through said vortex inhibitor passage and at least slightly toward said aft end of said outer nacelle, thereby generating an air curtain below said outer nacelle for inhibiting an inlet air vortex formation.

12. The method according to claim 11, wherein said vortex inhibitor passage includes a plurality of tubes extending at a predetermined angle from said outer nacelle.

13. The method according to claim 12, wherein said predetermined angle is between 15 and 90 degrees.

14. The method according to claim 11, wherein said step of directing fan air from said fan air bypass duct, includes the step of at least partially blocking said fan air bypass duct.

* * * * *